(12) United States Patent
Hou et al.

(10) Patent No.: US 12,080,902 B2
(45) Date of Patent: *Sep. 3, 2024

(54) BATTERY MODULE

(71) Applicant: CONTEMPORARY AMPEREX TECHNOLOGY CO., LIMITED, Ningde (CN)

(72) Inventors: Yujia Hou, Ningde (CN); Shubing You, Ningde (CN); Jihua Yao, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 3 days.

This patent is subject to a terminal disclaimer.

(21) Appl. No.: 18/181,744

(22) Filed: Mar. 10, 2023

(65) Prior Publication Data

US 2023/0216122 A1 Jul. 6, 2023

Related U.S. Application Data

(63) Continuation of application No. 16/552,272, filed on Aug. 27, 2019, now Pat. No. 11,626,641.

(30) Foreign Application Priority Data

Apr. 18, 2019 (CN) .......................... 201920529830.1

(51) Int. Cl.
*H01M 50/204* (2021.01)
*H01M 50/20* (2021.01)
*H01M 50/264* (2021.01)

(52) U.S. Cl.
CPC ......... *H01M 50/204* (2021.01); *H01M 50/20* (2021.01); *H01M 50/264* (2021.01); *H01M 2220/20* (2013.01)

(58) Field of Classification Search
CPC .. H01M 50/204; H01M 50/20; H01M 50/264; H01M 2220/20; H01M 8/248; H01M 10/0481

See application file for complete search history.

(56) References Cited

U.S. PATENT DOCUMENTS

| 4,020,244 A | 4/1977 | Selinko |
| 8,968,912 B2 | 3/2015 | Maguire et al. |

(Continued)

FOREIGN PATENT DOCUMENTS

| CN | 102110799 A | 6/2011 |
| CN | 205609622 U | 9/2016 |

(Continued)

OTHER PUBLICATIONS

International Search Report for Application No. PCT/CN2020/083282, mailed Jul. 2, 2020.

(Continued)

*Primary Examiner* — Kiran Quraishi Akhtar
(74) *Attorney, Agent, or Firm* — Ladas & Parry LLP

(57) ABSTRACT

The present disclosure provides a battery module. The battery module includes a plurality of batteries that are stacked and two end plates disposed at two ends of the plurality of batteries in a stacking direction of the batteries. The battery module further includes a fixing strap, which includes a strap-shaped body and an elastic fixing part. The strap-shaped body surrounds the plurality of batteries and the end plates and defines a gap. The elastic fixing part is disposed in the gap and connected to the strap-shaped body. The elastic fixing part, together with the strap-shaped body, can provide an expansion space for the battery module with a certain restraint. In this way, the deformation of the battery module can be suppressed, and the battery module is protected from being damaged by a shear force of the strap- (Continued)

shaped body, thereby improving reliability of the battery performance.

5 Claims, 5 Drawing Sheets

(56) References Cited

U.S. PATENT DOCUMENTS

| | | | |
|---|---|---|---|
| 2006/0093890 A1 | 5/2006 | Steinbroner | |
| 2011/0151312 A1* | 6/2011 | Kim | H01M 10/0481 |
| | | | 429/156 |
| 2012/0237834 A1 | 9/2012 | Ogasa | |
| 2013/0164592 A1 | 6/2013 | Maguire et al. | |
| 2014/0030566 A1 | 1/2014 | Lee | |
| 2015/0079451 A1* | 3/2015 | Jeong | H01M 50/50 |
| | | | 429/151 |
| 2016/0240827 A1 | 8/2016 | Sakurai | |
| 2017/0352850 A1 | 12/2017 | Nagane et al. | |
| 2019/0006643 A1 | 1/2019 | Sakurai | |
| 2019/0363392 A1 | 11/2019 | Kim et al. | |

FOREIGN PATENT DOCUMENTS

| | | |
|---|---|---|
| CN | 205790141 U | 12/2016 |
| CN | 106654103 A | 5/2017 |
| CN | 207381491 U | 5/2018 |
| CN | 207529996 U | 6/2018 |
| CN | 207967116 U | 10/2018 |
| CN | 109148756 A | 1/2019 |
| CN | 209401761 U | 9/2019 |
| EP | 2819210 A1 | 12/2014 |
| EP | 2958165 A1 | 12/2015 |
| EP | 3343667 A1 | 7/2018 |
| JP | 2012209256 A1 | 10/2012 |
| JP | 2012-237834 A1 | 12/2012 |
| JP | 2012256466 A | 12/2012 |
| WO | 2014167019 A1 | 10/2014 |
| WO | 2016084272 A1 | 6/2016 |
| WO | 2019054619 A1 | 3/2019 |

OTHER PUBLICATIONS

Written Opinion for Application No. PCT/CN2020/083282, mailed Jul. 2, 2020.

Partial European Search Report for Application No. EP 19192628.6, mailed Feb. 24, 2020.

First Office Action of EP application No. 19192628.6, mailed Jul. 21, 2021.

* cited by examiner

BATTERY MODULE

CROSS-REFERENCE TO RELATED APPLICATIONS

The present application is a continuation of U.S. patent application Ser. No. 16/552,272, filed on Aug. 27, 2019, which claims priority to Chinese Patent Application No. 201920529830.1, filed on Apr. 18, 2019. The contents of the aforementioned patent applications are incorporated herein by reference in their entirety.

TECHNICAL FIELD

The present disclosure relates to the technical field of energy storage devices, and in particular, to a battery module.

BACKGROUND

A battery module is an important part of a new energy vehicle and includes a plurality of batteries connected to each other. With the charging and discharging of the battery module, the battery module is prone to expansion and deformation. Therefore, an end plate is provided at each end of the plurality of batteries for suppressing the expansion of the battery. In the related art, a fixing strap is used to fix the end plate and the plurality of batteries. However, if the expansion is too great, an interfering restraint will be caused between the fixing strap and the plurality of batteries, producing a shear force that may damage the plurality of batteries and further cause a failure of the plurality of batteries.

SUMMARY

The present disclosure provides a battery module for solving the problems existing in the related art, in order to provide the batteries with restraint and improve reliability of the battery performance.

The present disclosure provides a battery module. The battery module includes a plurality of batteries that is stacked; two end plates disposed at two ends of the plurality of batteries in a direction in which the plurality of batteries is stacked; and a fixing strap including a strap-shaped body and an elastic fixing part. The strap-shaped body surrounds the plurality of batteries and the two end plates and defines a gap, and the elastic fixing part is disposed in the gap and connected to the strap-shaped body.

In an embodiment, the elastic fixing part is a spring, and two ends of the spring are respectively connected to two ends of the strap-shaped body to form a closed fixing strap.

In an embodiment, each of the two ends of the strap-shaped body is provided with a hook hole, and each of the two ends of the spring is hooked in a corresponding hook hole.

In an embodiment, the fixing strap further includes a cover plate for covering a side of the spring facing away from the plurality of batteries, and the cover plate is fixedly connected to one of the two end plates through a connecting part.

In an embodiment, the cover plate includes an arcuate cover body and third connection portions, the arcuate cover body covers the side of the spring facing away from the plurality of batteries, the third connection portions are respectively arranged at a top and a bottom of the arcuate cover body and are each provided with a fixing hole, and the connecting part is connected to one of the two end plates by penetrating the fixing hole.

In an embodiment, the elastic fixing part comprises two elastic sheets, each of the two elastic sheets includes a first connection portion and second connection portion, the first connection portion elastically presses against a side of one of the two end plates facing away from the plurality of batteries, and the second connection portion is detachably connected to a side of an end of the strap-shaped body facing away from the plurality of batteries.

In an embodiment, the first connection portion includes an arcuate press-contact surface, and the press-contact surface presses against the side of the one of the two end plates facing away from the plurality of batteries.

In an embodiment, a press-contact slot is provided at the side of the one of the two end plates facing away from the plurality of batteries, and the press-contact surface presses into the press-contact slot.

In an embodiment, the second connection portion is provided with a hooking hole; and a hook is provided at a side of the strap-shaped body facing away from the plurality of batteries; the hooking hole matches the hook.

In an embodiment, the hook includes a body portion and an extending portion, the body portion includes a flat prism shape, and the body portion is formed at a side of one of the two ends of the strap-shaped body facing away from the plurality of batteries, and the extending portion is connected to the body portion and extends in a direction facing away from the gap defined by the strap-shaped body.

In an embodiment, the elastic sheet further includes a transition portion that connects the first connection portion with the second connection portion, the transition portion includes an arcuate section and a straight section, and the arcuate section bypasses the end of the strap-shaped body, a limiting portion is provided on the side of the end plate facing away from the plurality of batteries, and the straight section is inserted in the limiting portion.

In an embodiment, the limiting portion includes a frame-shaped structure, and the straight section passes through the frame-shaped structure.

The technical solution provided by the present disclosure can bring the following beneficial effects:

The battery module provided by the present disclosure includes a plurality of batteries that are stacked, end plates, and a fixing strap. The fixing strap includes a strap-shaped body and an elastic fixing part. The strap-shaped body surrounds the plurality of batteries and the end plates to limit displacement and deformation of the batteries when the plurality of batteries expand, thereby suppressing the deformation of the battery module. The strap-shaped body defines a gap, and the elastic fixing part is disposed in the gap and connected to the strap-shaped body. When the battery module deforms, the elastic fixing part can provide a certain elastic displacement space for the battery module. The elastic fixing part, together with the strap-shaped body, can provide an expansion space for the battery module with a certain restraint. In this way, the deformation of the battery module can be suppressed, and the battery module is protected from being damaged by a shear force of the strap-shaped body, thereby improving the reliability of the battery performance.

It should be understood that the foregoing general description and the following detailed description are merely illustrative and are not intended to limit the present disclosure.

BRIEF DESCRIPTION OF DRAWINGS

In order to more clearly illustrate technical solutions in embodiments of the present disclosure or in the related art, the accompanying drawings used in the embodiments and in the related art are briefly introduced as follows. It should be noted that the drawings described as follows are merely part of the embodiments of the present disclosure, other drawings can also be acquired by those skilled in the art without paying creative efforts.

REFERENCE SIGNS 1 battery;
2 end plate;
   21 press-contact slot;
   22 limiting portion;
3 fixing strap;
   31 strap-shaped body;
      311 hook;
         311a body portion;
         311b extending portion;
      312 hook hole;
      313 gap;
   32 elastic fixing part;
      321 spring;
      322 elastic sheet;
         322a first connection portion;
         322b press-contact surface;
         322c second connection portion;
         322d hooking hole;
         322e arcuate section;
         322f straight section;
   33 cover plate;
      331 arcuate cover body;
      332 third connection portion;
      333 fixing hole;
   34 connecting part.

The accompanying drawings are incorporated into the present specification and constitute a part of the present specification, for illustrating the embodiments of the present disclosure and explaining principles of the present disclosure together with the specification.

DETAILED DESCRIPTION

The technical solutions in the embodiments of the present disclosure are described as follow with reference to the accompanying drawings. It should be noted that, the described embodiments are merely parts of the embodiments of the present disclosure, which shall not be interpreted as providing limitations to the present disclosure. The following description of at least one embodiment is merely illustrative and not intended to limit the present disclosure or its implementation or use. According to the embodiments of the present disclosure, all other embodiments obtained by those skilled in the art without creative efforts fall within the scope of the present disclosure.

Figure 1:
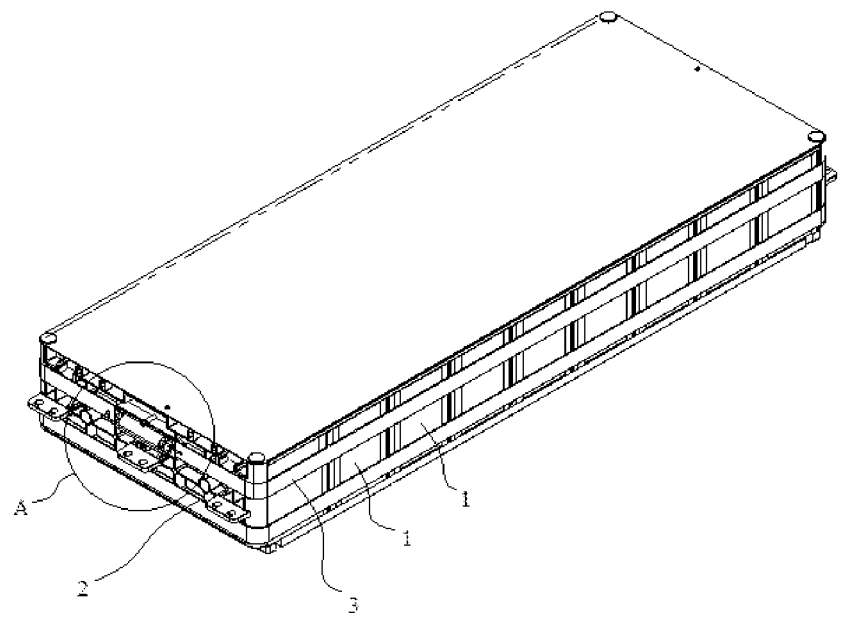
FIG. 1 is a structural schematic diagram of a battery module according to an embodiment of the present disclosure.

FIG. 1 is a structural schematic diagram of a battery module according to an embodiment of the present disclosure. As shown in FIG. 1, an embodiment of the present disclosure provides a battery module, including a plurality of batteries 1 that are stacked and end plates 2. The plurality of batteries 1 is connected to each other. The pair of end plates 2 is disposed at two ends of the plurality of batteries 1 in a stacking direction.

Figure 2:
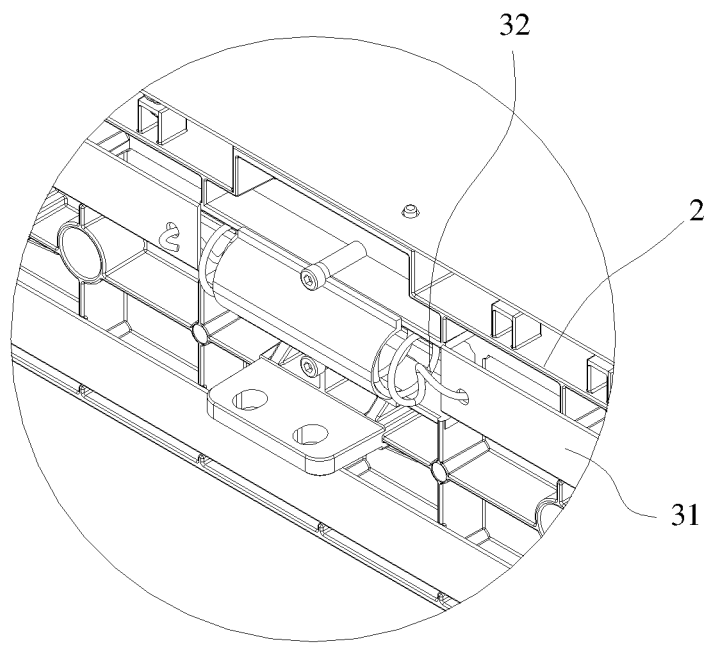
FIG. 2 is an enlarged view of an area A in FIG. 1.
Figure 3:
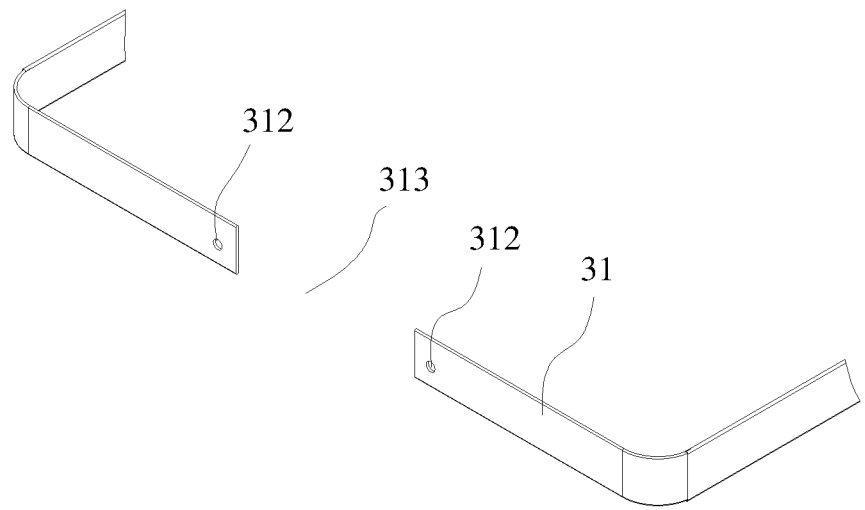
FIG. 3 is a partial schematic diagram of a strap-shaped body.

FIG. 2 is an enlarged view of an area A in FIG. 1, and FIG. 3 is a partial schematic diagram of a strap-shaped body. As shown in FIG. 2 and FIG. 3, the battery module further includes a fixing strap 3, the fixing strap 3 includes a strap-shaped body 31 and an elastic fixing part 32. The strap-shaped body 31 surrounds the plurality of batteries 1 and the end plates 2 to avoid their displacement and deformation during the expansion of the batteries 1, thereby suppressing the deformation of the battery module. The strap-shaped body 31 defines a gap 313, and the elastic fixing part 32 is disposed in the gap 313. The elastic fixing part 32 is connected to the strap-shaped body 31.

When the battery module deforms, the elastic fixing part 32 can provide a certain elastic displacement space for the battery module. The elastic fixing part 32, together with the strap-shaped body 31, can provide an expansion space for the battery module with a certain restraint. In this way, the deformation of the battery module can be suppressed, and the battery module is protected from being damaged by a shear force of the strap-shaped body 31, thereby improving reliability of the battery performance.

In a preferred embodiment, the elastic fixing part 32 described above is a spring 321, and two ends of the spring 321 are respectively connected to two ends of the strap-shaped body 31 to form a closed fixing strap 3. The spring 321 may be a helical spring, and two ends of the helical spring are respectively connected to the two ends of the strap-shaped body 31.

Each end of the strap-shaped body 31 is provided with a hook hole 312, and the two ends of the spring 321 are hooked in the corresponding hook holes 312. In this way, the spring 321 is fixed to the strap-shaped body 31 by hooking. When the battery module expands, the spring 321 and the strap-shaped body 31 together provide the displacement and deformation space for the battery module with a certain restraint, thereby preventing the battery module from being sheared and damaged by the strap-shaped body 31. Moreover, the spring 321 is hooked on the strap-shaped body 31 through the hook holes 312, which facilitates the disassembly during maintenance.

Figure 4:
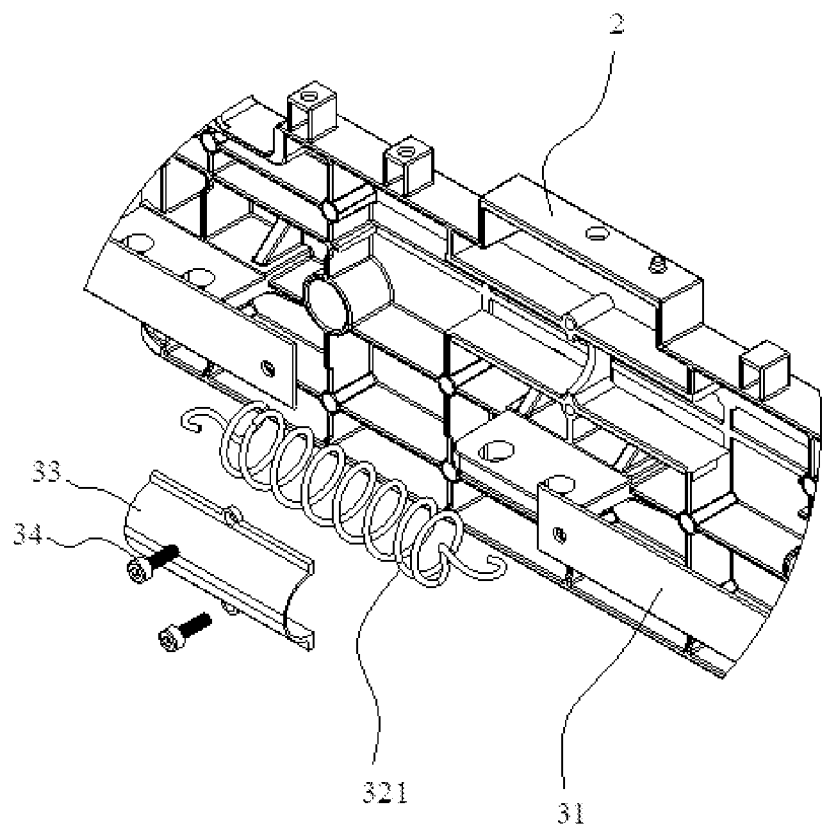
FIG. 4 is an exploded view of a partial structure of a battery module according to an embodiment of the present disclosure.

FIG. 4 is an exploded view of a partial structure of a battery module according to an embodiment of the present disclosure. As shown in FIG. 4, the fixing strap 3 further includes a cover plate 33 for covering a side of the spring 321 facing away from the batteries 1. The cover plate 33 is fixedly connected to the end plate 2 by a connecting part 34. The cover plate 33 can relatively restrain the springs 321, thereby further preventing the batteries 1 from expanding along a direction facing away from each other. When the batteries 1 expand to a certain extent, the cover plate 33 can exert a counterforce on the spring 321 to prevent the spring 321 from excessively elongating and thus detaching from the hook hole 312. Moreover, since the spring 321 is restrained by the cover plate 33, the spring 321 is unlikely to excessively move in an axial direction of the spring 321, thereby ensuring a fixing effect of the fixing strap 3 on the battery module. The connecting part 34 described above may be a bolt, and the end plate 2 is provided with a threaded hole. The bolt passes through a hole in the cover plate 33 and is fixedly connected to the end plate 2 through the threaded hole.

Figure 5:
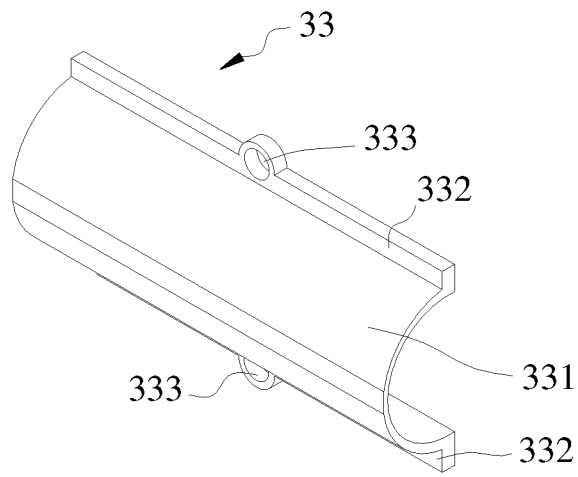
FIG. 5 is a structural schematic diagram of a cover plate.

FIG. 5 is a structural schematic diagram of a cover plate. The cover plate 33 includes an arcuate cover body 331 and third connection portions 332. The arcuate cover body 331 covers a side of the spring 321 facing away from the batteries 1. The third connection portions 332 are located at the top and the bottom of the arcuate cover body 331, and each of the third connection portions 332 is provided with a fixing hole 333. The connecting part 34 is connected to the end plate 2 by passing through the fixing holes 333. The third connection portions 332 may be formed with the arcuate cover body 331 into one piece. Since two short sides of the arcuate cover body 331 are close to the strap-shaped body 31 and thus could not provide enough space for the connecting part 34, the third connection portions 332 extend along two long sides of the arcuate cover body 331 and in a direction perpendicular to the long sides of the arcuate cover body 331. Moreover, a gap is formed between each of the two short sides of the arcuate cover body 331 and a corresponding end of the strap-shaped body 31, thereby forming a certain deformation space for the spring 321.

In an embodiment, an inner contour of the arcuate cover body 331 matches an outer contour of the spring 321. In this embodiment, the arcuate cover body 331 has a substantially semi-circular cross-section, which is adapted to the shape of the spring 321. When the arcuate cover body 331 is fixed to the end plate 2, the arcuate cover body 331 can evenly cover the spring 321. Once the spring 321 is deformed along with the battery module, the deformed spring 321 is subjected to evenly distributed force along a circumferential direction, thereby preventing the hooks of the spring from being detached at either side.

Figure 6:
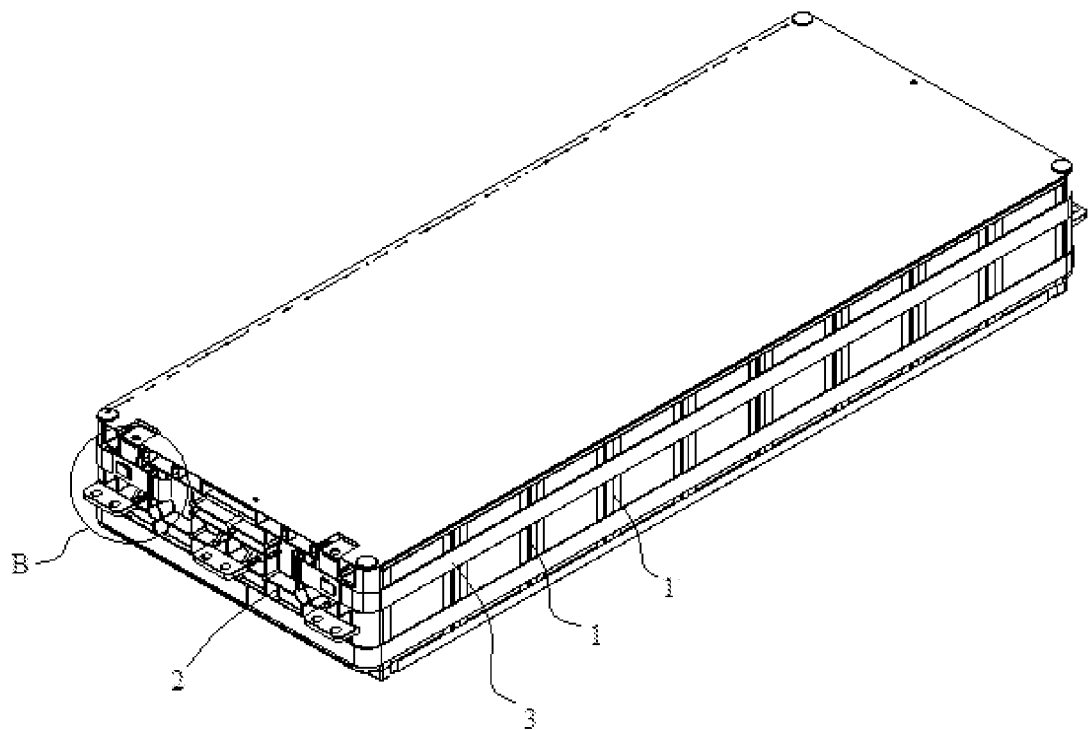
FIG. 6 is a structural schematic diagram of a battery module according to another embodiment of the present disclosure.
Figure 7:
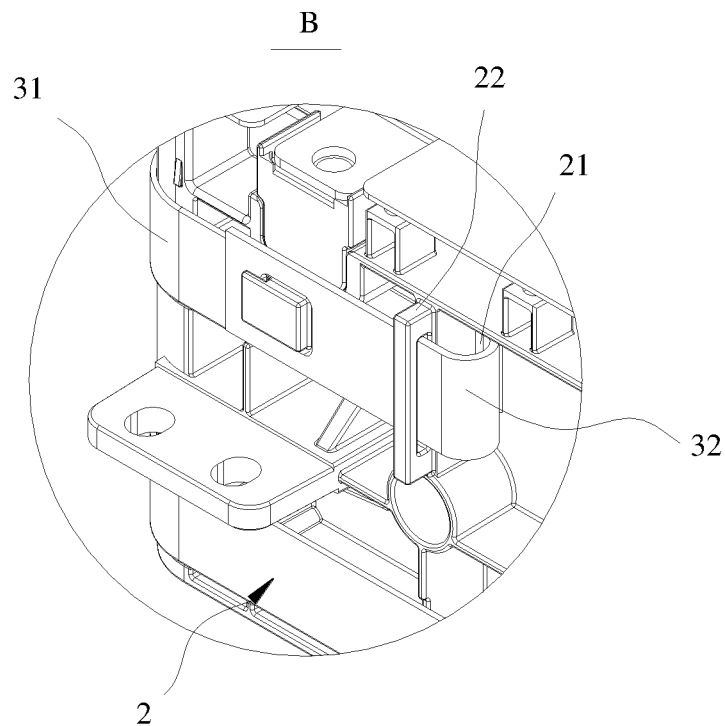
FIG. 7 is an enlarged view of an area B in FIG. 6.
Figure 8:
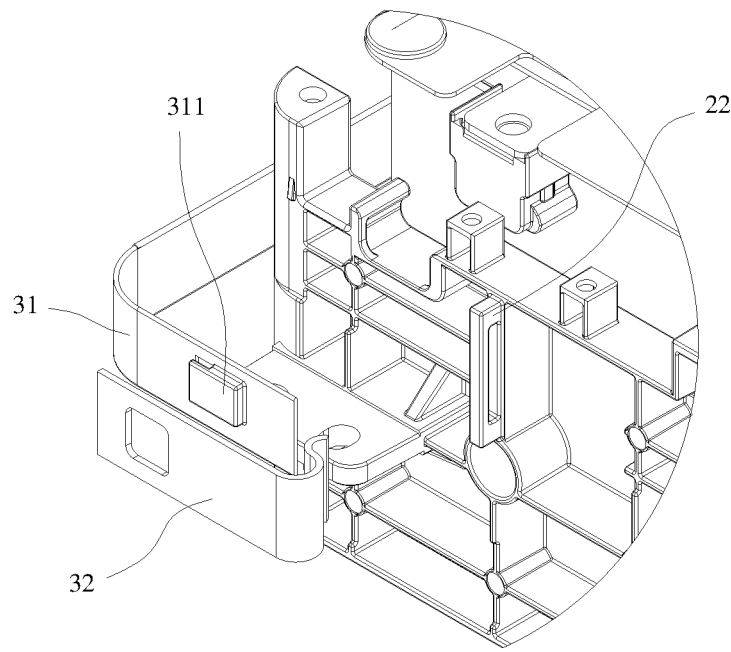
FIG. 8 is an exploded view of a partial structure of a battery module according to another embodiment of the present disclosure.

FIG. 6 is a structural schematic diagram of a battery module according to another embodiment of the present disclosure, FIG. 7 is an enlarged view of an area B in FIG. 6, and FIG. 8 is an exploded view of a partial structure of a battery module according to another embodiment of the present disclosure. In the embodiment shown in FIG. 6, the battery module has a substantially same structure as the above battery module. That is, the battery module also includes a plurality of batteries 1 that are stacked and end plates 2, the batteries 1 are connected to each other, and the pair of end plates 2 is disposed at two ends of the plurality of batteries 1.

As shown in FIG. 7 and FIG. 8, the battery module further includes a fixing strap 3, which includes a strap-shaped body 31 and an elastic fixing part 32. The strap-shaped body 31 surrounds the plurality of batteries 1 and the end plates 2 to avoid their displacement and deformation during the expansion of the batteries 1, thereby suppressing the deformation of the battery module. The strap-shaped body 31 defines a gap 313, and the elastic fixing part 32 is disposed in the gap 313. The elastic fixing part 32 is connected to the strap-shaped body 31.

Figure 9:
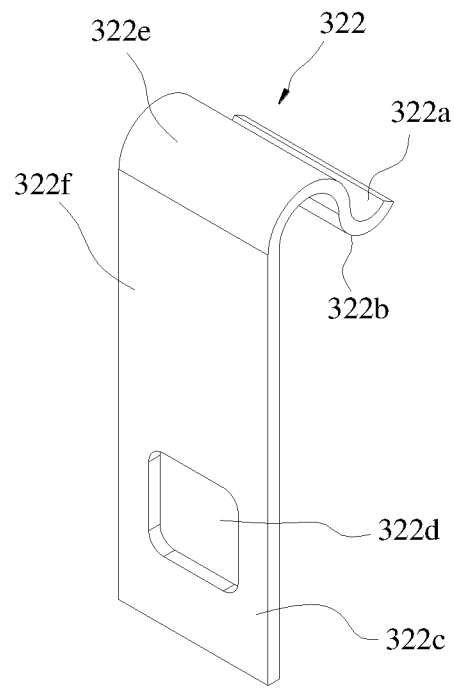
FIG. 9 is a schematic view of a structure of an elastic sheet.

In this embodiment, the elastic fixing part 32 includes a pair of elastic sheets 322. FIG. 9 is a structural schematic diagram of the elastic sheet. As shown in FIG. 9, each elastic sheet 322 includes a first connection portion 322a and a second connection portion 322c. The first connection portion 322a elastically presses against a side of the end plate 2 facing away from the batteries 1, and the second connection portion 322c is detachably connected to a side of an end of the strap-shaped body 31 facing away from batteries 1. Since the first connection portion 322a elastically presses against the end plate 2, it can provide a certain displacement for the battery module when the battery module expands and deforms. Under the restraint of the strap-shaped body 31, the battery module has a certain displacement space. In this way, the deformation of the battery module can be suppressed, and the battery module can be protected from being damaged by a shear force of the strap-shaped body 31.

With reference to FIG. 9, the first connection portion 322a has an arcuate press-contact surface 322b that presses against the side of the end plate 2 facing away from the batteries 1. When the arcuate press-contact surface 322b is in contact with the outer side of the end plate 2, a relatively great pressure can be generated due to a small pressing area between the arcuate press-contact surface 322b and the end plate 2, so that the end plate 2 can be tightly pressed. The arcuate crimping surface 322b has a smooth transition, and thus would not generate a great local stress on the end plate 2, thereby protecting the end plate 2 from being damaged.

With reference to FIG. 7, for example, a press-contact slot 21 is provide at the side of the end plate 2 facing away from the plurality of batteries 1, and the press-contact surface 322b presses in the press-contact slot 21, such that the first connection portion 322a is located in the press-contact slot 21. In this way, even if the battery module is subjected to a vibration, the first connection portion 322a of the elastic sheet 322 would not escape from the press-contact slot 21, thereby ensuring the reliability of connection between the elastic sheet 322 and the end plate 2.

With reference to FIG. 9, the second connection portion 322c is provided with a hooking hole 322d, a hook 311 is provided at the side of the strap-shaped body 31 facing away from the plurality of batteries 1, and the hooking hole 322d matches the hook 311. The elastic sheet 322 is connected to the strap-shaped body 31 by the matching between the hooking hole 322d and the hook 311, which facilitates the assembly and disassembly.

Figure 10:
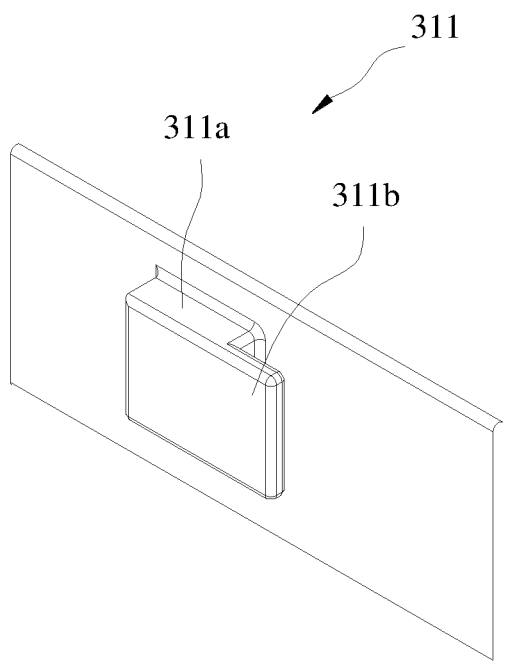
FIG. 10 is a structural schematic diagram of a hook.

FIG. 10 is a structural schematic diagram of a hook. In an embodiment, the above-mentioned hook 311 includes a body portion 311a and an extending portion 311b. The body portion 311a has a flat prism shape, and the body portion 311a is formed at a side of each end of the strap-shaped body 31 facing away from the plurality of batteries 1. The extending portion 311b is connected to the body portion 311a and extends in a direction facing away from the gap 313 defined by the strap-shaped body 31. In combination with FIG. 8, the above-mentioned hook 311 is located on the strap-shaped body 31 at a left side of the gap 313 shown in FIG. 3. After the elastic sheet 322 is assembled, the hooking hole 322d matches the hook 311, and the respective extending portions 311b of the two hooks 311 extend in the direction facing away from the gap 313. When the battery module expands and deforms, the expansion and deformation first occur at a position of the gap 313. With the continuous expansion of the battery module, the elastic sheet 322 is subjected to a pulling force. The hooking between the hooking hole 322d and the hook 311 become tighter with the increasing expansion and deformation. Thus, the extending portion 311b prevents the elastic sheet 322 from escaping and limits the displacement of the elastic sheet 322 to some extent. The prism-shaped body portion 311a is rigid, thereby preventing the hook 311 from being pulled to break by the elastic sheet 322 during the deformation of the battery module.

As shown in FIG. 9, preferably, the elastic sheet 322 further includes a transition portion that connects the first connection portion 322a with the second connection portion 322c. The transition portion includes an arcuate section 322e and a straight section 322f. The arc section 322e bypasses the end of the strap-shaped body 31. With reference to FIG. 7 and FIG. 8, a limiting portion 22 is provided on the side of the end plate 2 facing away from the batteries 1, and the straight portion 322f is inserted into the limiting portion 22.

The arcuate section can increase the overall elasticity of the elastic sheet 322 and provide a smooth transition to the press-contact surface 322b of the first connection portion 322a, thereby achieving the elastic press-contact with the end plate 2. Moreover, during the assembly of the end plate 2 and the elastic sheet 322, the arcuate section can avoid the structure on the end plate 2. The straight section 322f is attached to the strap-shaped body 31, without interference with other components on the vehicle after the battery module is mounted on a vehicle.

For example, the limiting portion 22 is a frame-shaped structure, and the above-mentioned straight section 322f is inserted into the frame-shaped structure, so that the elastic sheet 322 is prevented from being separated from the end plate 2 during the deformation of the battery module.

For example, the above-mentioned elastic sheet 322 may be an elastic steel sheet.

The above-described embodiments are merely preferred embodiments of the present disclosure and are not intended to limit the present disclosure. Any modifications, equivalent substitutions and improvements made within the principle of the present disclosure shall fall into the protection scope of the present disclosure.

What is claimed is:

1. A battery module, comprising:
   a battery stack comprising a plurality of batteries that are connected to each other;
   two end plates respectively disposed at two ends of the battery stack in a direction in which the batteries are stacked; and
   a fixing strap surrounding the battery stack and the endplates;
   wherein the fixing strap comprises a strap-shaped body and an elastic fixing part,
   the strap-shaped body surrounds the battery stack and the two end plates, two ends of the strap-shape body are separated by a gap, and the elastic fixing part connects the two ends of the strap-shaped body to form a closed loop;
   wherein the gap is positioned next to a first end plate of the two end plate,
   wherein the elastic fixing part is a spring, and two ends of the spring are respectively connected to the two ends of the strap-shaped body;
   wherein the fixing strap further comprises a cover plate for covering a side of the spring facing away from the battery stack, and the cover plate is fixedly attached to the first end plate through a connecting mechanism; and
   wherein the connecting mechanism comprises two connecting parts, wherein the cover plate comprises an arcuate cover body and two connection portions, the arcuate cover body covers the side of the spring facing away from the battery stack, the connection portions are respectively arranged at a top edge and a bottom edge of the arcuate cover body and are each provided with a fixing hole, and the connecting parts are attached to the first end plate by penetrating the respective fixing holes.

2. The battery module according to claim 1, wherein each of the two ends of the strap-shaped body is provided with a hook hole, and each of the two ends of the spring is hooked in a corresponding hook hole.

3. The battery module according to claim 1, wherein the connecting parts are bolts, and the first end plate is provided with threaded holes for receiving the bolts.

4. The battery module according to claim 1, wherein a cross section of the arcuate cover body matches a shape of the spring.

5. The battery module according to claim 1, wherein a length of the gap is shorter than a dimension of the first end plate along a direction in which the fixing strap is disposed, and at least a part of the strap-shaped body overlaps with the first end plate.

* * * * *